(12) United States Patent
Gooch et al.

(10) Patent No.: US 12,310,474 B2
(45) Date of Patent: May 27, 2025

(54) MULTI-MATERIAL LENS PACKAGE

(71) Applicant: Johnson & Johnson Vision Care, Inc., Jacksonville, FL (US)

(72) Inventors: William Gooch, Jacksonville, FL (US); Scott F. Ansell, Ponte Vedra Beach, FL (US); Gerard Sheehan, Limerick (IE); Timothy Burkill, Limerick (IE)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 17/934,280

(22) Filed: Sep. 22, 2022

(65) Prior Publication Data

US 2023/0110394 A1 Apr. 13, 2023

Related U.S. Application Data

(60) Provisional application No. 63/253,958, filed on Oct. 8, 2021.

(51) Int. Cl.
| | | |
|---|---|---|
| *A45C 11/00* | (2006.01) | |
| *B29C 45/16* | (2006.01) | |
| *B29K 23/00* | (2006.01) | |
| *B29K 105/26* | (2006.01) | |
| *B29L 31/00* | (2006.01) | |

(52) U.S. Cl.
CPC ............ *A45C 11/005* (2013.01); *B29C 45/16* (2013.01); *B29K 2023/12* (2013.01); *B29K 2105/26* (2013.01); *B29K 2995/002* (2013.01); *B29K 2995/0026* (2013.01); *B29L 2031/712* (2013.01)

(58) Field of Classification Search
CPC .. A45C 11/005; A45C 11/0046; A45C 11/046

USPC .......................................................... 206/5.1
See application file for complete search history.

(56) References Cited

U.S. PATENT DOCUMENTS

| | | | |
|---|---|---|---|
| 289,923 | A | 12/1883 | Hoogesteger |
| 3,408,429 | A | 10/1968 | Otto |
| 3,660,545 | A | 5/1972 | Wichterle |
| 3,678,633 | A | 7/1972 | Block |
| 3,808,178 | A | 4/1974 | Gaylord |
| 3,955,726 | A | 5/1976 | Reitzel |

(Continued)

FOREIGN PATENT DOCUMENTS

| | | |
|---|---|---|
| EP | 0080539 B1 | 5/1986 |
| EP | 1930243 A1 | 6/2008 |

(Continued)

OTHER PUBLICATIONS

"Compendium of Polymer Terminology and Nomenclature: IUPAC Recommendations", edited by: Richard G. Jones, Jaroslav Kahovec, Robert Stepto, Edward S. Wilks, Michael Hess, Tatsuki Kitayama, and W. Val Metanomski, 8 pages, 2008.

(Continued)

*Primary Examiner* — Steven A. Reynolds
(74) *Attorney, Agent, or Firm* — Karen A. Harding (57) ABSTRACT

There is described a contact lens package containing a bowl for holding a contact lens and a flange around the bowl which may be made from a different polymer material than the bowl. The packages comprise at least one interface tab with at least one slot so that the second polymer material forming the flange can encapsulate the tab providing a mechanical interlock displaying good flexural strength.

53 Claims, 4 Drawing Sheets

(56) References Cited

U.S. PATENT DOCUMENTS

| | | | |
|---|---|---|---|
| 4,113,224 A | 9/1978 | Clark et al. |
| 4,120,570 A | 10/1978 | Gaylord |
| 4,136,250 A | 1/1979 | Mueller et al. |
| 4,153,641 A | 5/1979 | Deichert et al. |
| 4,197,266 A | 4/1980 | Clark et al. |
| 4,399,093 A | 8/1983 | Kirby et al. |
| 4,436,887 A | 3/1984 | Chromecek et al. |
| 4,495,313 A | 1/1985 | Larsen |
| 4,659,782 A | 4/1987 | Spinelli |
| 4,659,783 A | 4/1987 | Spinelli |
| 4,691,820 A | 9/1987 | Martinez |
| 4,740,533 A | 4/1988 | Su et al. |
| 4,889,664 A | 12/1989 | Kindt-larsen et al. |
| 4,910,277 A | 3/1990 | Bambury et al. |
| 4,948,856 A | 8/1990 | Minchak et al. |
| 5,006,622 A | 4/1991 | Kunzler et al. |
| 5,034,461 A | 7/1991 | Lai et al. |
| 5,039,459 A | 8/1991 | Kindt-larsen et al. |
| 5,070,215 A | 12/1991 | Bambury et al. |
| 5,194,544 A | 3/1993 | Goldberg et al. |
| 5,224,593 A | 7/1993 | Bennett |
| 5,236,969 A | 8/1993 | Kunzler et al. |
| 5,244,981 A | 9/1993 | Seidner et al. |
| 5,270,418 A | 12/1993 | Kunzler et al. |
| 5,298,533 A | 3/1994 | Nandu et al. |
| 5,314,960 A | 5/1994 | Spinelli et al. |
| 5,331,057 A | 7/1994 | Brekner et al. |
| 5,331,067 A | 7/1994 | Seidner et al. |
| 5,371,147 A | 12/1994 | Spinelli et al. |
| 5,383,550 A | 1/1995 | Tsao |
| 5,433,314 A | 7/1995 | Lin |
| 5,468,803 A | 11/1995 | Takahashi et al. |
| 5,468,819 A | 11/1995 | Goodall et al. |
| 5,620,088 A | 4/1997 | Martin et al. |
| 5,760,100 A | 6/1998 | Nicolson et al. |
| 5,776,999 A | 7/1998 | Nicolson et al. |
| 5,789,461 A | 8/1998 | Nicolson et al. |
| 5,824,719 A | 10/1998 | Kunzler et al. |
| 5,849,811 A | 12/1998 | Nicolson et al. |
| 5,962,548 A | 10/1999 | Vanderlaan et al. |
| 5,965,631 A | 10/1999 | Nicolson et al. |
| 5,998,498 A | 12/1999 | Vanderlaan et al. |
| 6,020,445 A | 2/2000 | Vanderlaan et al. |
| 6,066,374 A | 5/2000 | Healy et al. |
| 6,087,415 A | 7/2000 | Vanderlaan et al. |
| 6,090,888 A | 7/2000 | Khanarian et al. |
| 6,367,929 B1 | 4/2002 | Maiden et al. |
| 6,420,453 B1 | 7/2002 | Bowers et al. |
| 6,423,761 B1 | 7/2002 | Bowers et al. |
| 6,767,979 B1 | 7/2004 | Muir et al. |
| D496,790 S | 10/2004 | Dzwill et al. |
| 6,822,016 B2 | 11/2004 | McCabe et al. |
| 6,867,245 B2 | 3/2005 | Iwata et al. |
| 6,943,203 B2 | 9/2005 | Vanderlaan et al. |
| 6,951,894 B1 | 10/2005 | Nicolson et al. |
| 7,052,131 B2 | 5/2006 | McCabe et al. |
| 7,086,526 B2 | 8/2006 | Newman |
| 7,247,692 B2 | 7/2007 | Laredo |
| 7,249,848 B2 | 7/2007 | Laredo et al. |
| 7,348,066 B2 | 3/2008 | Chien |
| 7,396,890 B2 | 7/2008 | Zanini et al. |
| 7,461,937 B2 | 12/2008 | Steffen et al. |
| 7,468,398 B2 | 12/2008 | Nicolson et al. |
| 7,538,146 B2 | 5/2009 | Nicolson et al. |
| 7,553,880 B2 | 6/2009 | Nicolson et al. |
| 7,572,841 B2 | 8/2009 | Chen et al. |
| 7,666,921 B2 | 2/2010 | McCabe et al. |
| 7,691,916 B2 | 4/2010 | McCabe et al. |
| 7,786,185 B2 | 8/2010 | Rathore et al. |
| 7,789,223 B2* | 9/2010 | Tokarski .............. A45C 11/005 206/5.1 |
| 7,825,170 B2 | 11/2010 | Steffen et al. |
| 7,915,323 B2 | 3/2011 | Awasthi et al. |
| 7,934,830 B2 | 5/2011 | Blackwell et al. |
| 7,956,131 B2 | 6/2011 | Arnold et al. |
| 7,994,356 B2 | 8/2011 | Awasthi et al. |
| 8,022,158 B2 | 9/2011 | Rathore et al. |
| 8,026,326 B2 | 9/2011 | Benz et al. |
| 8,138,290 B2 | 3/2012 | Blackwell et al. |
| 8,148,472 B1 | 4/2012 | Baugh et al. |
| 8,163,206 B2 | 4/2012 | Chang et al. |
| 8,273,802 B2 | 9/2012 | Laredo et al. |
| 8,389,597 B2 | 3/2013 | Blackwell et al. |
| 8,399,538 B2 | 3/2013 | Steffen et al. |
| 8,415,404 B2 | 4/2013 | Nicolson et al. |
| 8,420,190 B2 | 4/2013 | Fujita |
| 8,420,197 B2 | 4/2013 | Giraud et al. |
| 8,420,711 B2 | 4/2013 | Awasthi et al. |
| 8,450,387 B2 | 5/2013 | McCabe et al. |
| 8,459,445 B2 | 6/2013 | Newman |
| 8,470,906 B2 | 6/2013 | Rathore et al. |
| 8,487,058 B2 | 7/2013 | Liu et al. |
| 8,507,577 B2 | 8/2013 | Zanini et al. |
| 8,568,626 B2 | 10/2013 | Nicolson et al. |
| 8,637,621 B2 | 1/2014 | Iwata et al. |
| 8,703,891 B2 | 4/2014 | Broad |
| 8,937,110 B2 | 1/2015 | Alli et al. |
| 8,937,111 B2 | 1/2015 | Alli et al. |
| 8,940,812 B2 | 1/2015 | Reboul et al. |
| 8,980,972 B2 | 3/2015 | Driver |
| 9,056,878 B2 | 6/2015 | Fujisawa et al. |
| 9,057,821 B2 | 6/2015 | Broad et al. |
| 9,119,450 B2 | 9/2015 | Lee |
| 9,125,808 B2 | 9/2015 | Alli et al. |
| 9,140,825 B2 | 9/2015 | Alli et al. |
| 9,156,934 B2 | 10/2015 | Alli et al. |
| 9,170,349 B2 | 10/2015 | Mahadevan et al. |
| 9,217,813 B2 | 12/2015 | Liu et al. |
| 9,244,196 B2 | 1/2016 | Scales et al. |
| 9,244,197 B2 | 1/2016 | Alli et al. |
| 9,260,544 B2 | 2/2016 | Rathore et al. |
| 9,297,928 B2 | 3/2016 | Molock et al. |
| 9,297,929 B2 | 3/2016 | Scales et al. |
| 9,340,652 B2 | 5/2016 | Kunimoto |
| 9,358,736 B2 | 6/2016 | Wang et al. |
| 9,452,593 B2 | 9/2016 | Tatarka et al. |
| 9,656,416 B2 | 5/2017 | Takatsugi et al. |
| 10,004,309 B2 | 6/2018 | Ansell |
| 10,246,235 B2 | 4/2019 | Sebald |
| 10,578,890 B1 | 3/2020 | Cheslock |
| 10,618,257 B2 | 4/2020 | Suzuki et al. |
| 10,661,964 B2* | 5/2020 | Tokarski .............. A61K 31/4535 |
| 10,696,463 B2 | 6/2020 | Swamy |
| 10,842,787 B2 | 11/2020 | Ostrow et al. |
| 2002/0197478 A1 | 12/2002 | Muggli et al. |
| 2004/0134005 A1* | 7/2004 | Pankow ................ A61L 12/086 15/214 |
| 2004/0236024 A1 | 11/2004 | Rivett et al. |
| 2005/0047991 A1 | 3/2005 | Rees et al. |
| 2005/0205451 A1 | 9/2005 | Brown-Skrobot |
| 2006/0102496 A1* | 5/2006 | Christy ................ A45C 11/005 206/5.1 |
| 2008/0017525 A1 | 1/2008 | Newman |
| 2008/0137076 A1 | 6/2008 | Clements et al. |
| 2009/0078669 A1 | 3/2009 | Sakaguchi et al. |
| 2010/0048847 A1 | 2/2010 | Broad |
| 2010/0090181 A1 | 4/2010 | Wehefritz |
| 2010/0106128 A1* | 4/2010 | Mao .................... A61L 12/086 604/411 |
| 2010/0204523 A1 | 8/2010 | Tominaga et al. |
| 2012/0006695 A1 | 1/2012 | Kawai |
| 2012/0040129 A1 | 2/2012 | Tseng et al. |
| 2012/0267262 A1 | 10/2012 | Wang et al. |
| 2013/0180212 A1* | 7/2013 | Wang ................ B29D 11/00125 53/413 |
| 2014/0194024 A1 | 7/2014 | Pham |
| 2015/0174084 A1 | 6/2015 | Kaufmann et al. |
| 2016/0198825 A1 | 7/2016 | Fawdington |
| 2018/0137076 A1 | 5/2018 | Shao et al. |
| 2018/0356558 A1 | 12/2018 | Ochrombel |
| 2019/0271798 A1 | 9/2019 | Mahadevan et al. |
| 2020/0114603 A1 | 4/2020 | Chen et al. |
| 2020/0229561 A1 | 7/2020 | Almond et al. |
| 2020/0229562 A1 | 7/2020 | Almond et al. |

(56) References Cited

U.S. PATENT DOCUMENTS

| | | | |
|---|---|---|---|
| 2020/0229563 A1 | 7/2020 | Almond et al. | |
| 2021/0396911 A1 | 12/2021 | Miller et al. | |
| 2023/0113243 A1 | 4/2023 | Gooch et al. | |
| 2023/0276917 A1* | 9/2023 | Popwell | B65D 75/326 206/5.1 |

FOREIGN PATENT DOCUMENTS

| | | | |
|---|---|---|---|
| EP | 2537868 | A1 | 12/2012 |
| EP | 2043478 | B1 | 11/2014 |
| EP | 2803713 | A1 | 11/2014 |
| EP | 3520984 | B1 | 3/2021 |
| EP | 3805117 | A1 | 4/2021 |
| KR | 20130123812 | A | 11/2013 |
| KR | 1343713 | B1 | 12/2013 |
| WO | 98/21995 | A1 | 5/1998 |
| WO | 0136291 | A1 | 5/2001 |
| WO | 2003022321 | A2 | 3/2003 |
| WO | 2008061992 | A2 | 5/2008 |
| WO | 2012017984 | A1 | 2/2012 |
| WO | 2014095837 | A1 | 6/2014 |
| WO | 2019223910 | A1 | 11/2019 |

OTHER PUBLICATIONS

Crivello, et al., "Photoinitiators for Free Radical Cationic &amp; Anionic Photopolymerisation", In 2nd Edition, vol. III, pp. 275-298, 1998.

PCT International Search Report, dated Dec. 14, 2022, for PCT Int'l Appln. No. PCT/IB2022/059508.

PCT International Search Report, dated Aug. 8, 2006, for PCT Int'l. Appln. No. PCT/US2006/011438.

PCT International Search Report, dated Feb. 20, 2023, for PCT Int'l. Appln. No. PCT/IB2022/059504.

PCT International Search Report, dated Feb. 25, 2020, for PCT Int'l. Appln. No. PCT/IB2019/060672.

PCT International Search Report, dated Mar. 1, 2021, for PCT Int'l Appln. No. PCT/IB2020/061498.

Shin et al., Chemical Structure and Physical Properties of Cyclic Olefin Copolymers (IUPAC Technical Report), Pure and Applied Chemistry, vol. 77, No. 5, pp. 801-814, 2005.

Suzuki et al., Introduction to Cyclo Olefin Polymer (COP)—Key Properties Update, (2016) page 1.

U.S. Appl. No. 10/028,400, filed Dec. 20, 2001 (132 pages).

U.S. Appl. No. 10/029,526, filed Dec. 21, 2001 (41 pages).

U.S. Appl. No. 16/398,722, filed Apr. 30, 2019 (87 pages).

U.S. Appl. No. 16/548,204, filed Aug. 22, 2019 (77 pages).

U.S. Appl. No. 60/428,620, filed Nov. 22, 2002 (74 pages).

Yamazaki et al, Industrialization and application development of cyclo-olefin polymer, Journal of Molecular Catalysis A: Chemical, 2004, pp. 81-87, vol. 213.

Zeon Corporation, About Zeon, Zeonex.com, Oct. 18, 2017, 2 pages, https://www.zeonex.com/about.aspx.html.

Zeon Corporation, Zeon COP (Cyclo Olefin Polymer), Zeonex Injection Molding Guide, Aug. 2013, pp. 1-16, 0813002(SE).

Zeon Corporation, Zeon Cyclo-olefin polymers (COP), Zeonor General-Purpose Engineering Plastics, Oct. 18, 2017, pp. 1-4, Oct. 2017.

Zeon Corporation, Zeon Safety Data Sheet, Zeonor 1060R, Apr. 11, 2017, 8 pages, Z02812.

International Preliminary Report on Patentability for PCT/IB2022/059508 dated Dec. 12, 2023.

International Preliminary Report on Patentability for PCT/IB2022/059504 dated Apr. 9, 2024.

* cited by examiner

MULTI-MATERIAL LENS PACKAGE

RELATED APPLICATIONS

This application claims priority to U.S. Provisional Patent Application Ser. No. 63/253,958, filed Oct. 8, 2021, which is incorporated herein by reference in its entirety.

BACKGROUND OF THE INVENTION

Soft contact lenses are generally sold in a sealed sterile container often referred to as a blister package. The blister package has a plastic base with a well in which the contact lens and packing solution are housed, surrounded by a flange region which allows for sealing the base to a peelable film. The user opens the blister package by peeling the film away from the base.

The blister bowl must not interact with either the contact lens solution or contact lens, and thus generally cannot be made from recycled or colored materials, even though such materials could be environmentally sustainable or provide more distinctive packaging respectively. For lenses and packaging solutions with additional components such as wetting agents, pharmaceuticals and nutraceuticals, the portions of the plastic base must not absorb the additional components. However, many common packaging plastics like polypropylene can absorb such additional components. Plastic bases made from materials which do not absorb such additional components, such as cyclic olefin polymer materials and copolymer materials, have been proposed, but such materials can be expensive and difficult to mold.

U.S. Pat. No. 8,420,197 discloses using structural interlocks to mold articles from dissimilar mold materials. The structural interlocks are formed by creating an interlock cavity in the first material and filling the cavity with the second material. While the structural interlocks of U.S. Pat. No. 8,420,197 provide interlocks that provide good strength against lateral pull force, the interlocks can break upon imposition of flexural stress, such as would occur at the joint between a contact lens package bowl and flange, particularly upon opening. Thus, there remains a need for improved contact lens packages made from more than one material, including materials which do not readily bond together.

SUMMARY OF THE INVENTION

The present invention relates to packages used by consumers of contact lenses. More specifically, the present package allows the use of different, and in some cases, dissimilar materials in making a contact lens package so that different materials can be used for different parts of the package base, such as the bowl which holds the contact lens and packing solution and the flange, which surrounds the bowl. This attribute provides contact lenses packages that are sterile, do not interact with the lens or packing solution, and allows for greater flexibility in creating contact lens packages with desirable properties.

The present invention further relates to a package comprising:
  a package base comprising a bowl comprising a well for holding a lens and having at least one interface tab along a peripheral edge of the bowl, the interface tab comprising at least one interface slot;
  a flange at least partially surrounding the peripheral edge of the bowl, filling the interface slot and at least partially encapsulating the interface tab to form an interlock.

The Summary and Abstract sections may set forth one or more but not all exemplary embodiments of the present invention as contemplated by the inventors, and thus, are not intended to limit the present invention and the appended claims in any way.

DESCRIPTION OF THE INVENTION

Reference will now be made in detail to representative embodiments illustrated in the accompanying drawings wherein reference numerals indicate certain elements. The following descriptions are not intended to limit the myriad embodiments to those specifically described. To the contrary, it is intended to cover alternatives, modifications, and equivalents as can be included within the spirit and scope of the described embodiments as defined by the appended claims.

References to "one embodiment," "an embodiment," "some embodiments," "an example embodiment," etc., indicate that the embodiment described may include a particular feature, structure, aspect, or characteristic, but every embodiment may not necessarily include the particular feature, structure, or characteristic. Moreover, such phrases are not necessarily referring to the same embodiment. Further, when a particular feature, structure, aspect, or characteristic is described in connection with an embodiment, it is submitted that it is within the knowledge of one skilled in the art to affect such feature, structure, or characteristic in connection with other embodiments whether or not explicitly described.

The phraseology or terminology used herein is for the purpose of description and not of limitation, such that the terminology or phraseology of the present specification is to be interpreted by the skilled artisan in light of the teachings and guidance.

The variety of contact lenses materials and functionality are currently expanding. Contact lenses containing light absorbing materials such as photochromic compounds and UV or visible light absorbing contact lenses (for example blue blocking contact lenses) are becoming available. Current primary packaging (polypropylene blister and foil laminated lidstock) does not protect against transmission of UV or visible light and may allow the potential activation of the photochromic lens, resulting in photo-fatigue of the lens and loss of its efficacy.

Contact lenses packed with additives, such as pharmaceutical agents, nutraceutical agents and wetting agents have also been proposed. Some of these additives can interact with conventional packaging materials, including polypropylene, reducing the concentration of the active ingredient in the contact lens. However, it may not always be desirable to make the entire primary package out of specialty materials, and such specialty materials may not thermally bond to conventional materials such as polypropylene.

The present invention provides injection molded packages formed from at least two different materials. As used herein, different means that the composition or at least one property of the polymer materials are not the same. The polymer materials may be entirely different polymer materials, blends having different components (for example where one polymer material is a clear polymer material such as polypropylene and the other material is colored polypropylene); blends having different concentrations of the same polymer material components or the same polymer material with different impurity profiles (such as for example using virgin polymer material for one polymer material and a second polymer material comprising recycled polymer material). By decoupling the molding of the bowl from the flange, and providing a mechanical interlock at the interface between the bowl and the flange the present invention provides the designer of contact lens primary packages with an increased range of options to design and manufacture primary packages with a wide range of benefits.

The following terms are used in the present specification.

"Inert" means a component or material is non-reactive during the manufacture and use of the package.

"Lidstock" is a flexible film or sheet which is heat sealed to the base portion of the package to form a sealed cavity. Lidstock is generally multilayered and comprises a support layer and a peelable seal layer. The lidstock may further comprise additional layers including print layers, lamination layers, foil layers and combinations thereof and the like.

"Pharmaceutical agent" means any compound used to diagnose, cure, treat, or prevent disease. "Ophthalmic pharmaceutical agent" means any compound used to diagnose, cure, treat, or prevent disease or conditions of the ocular system, including the eye and eyelids. Examples of ophthalmic pharmaceutical agents include antibacterial compounds, antiallergic agents, anti-inflammatories, miotics, compounds which treat dry eye, glaucoma, or slow or prevent the progression of myopia or presbyopia.

The term "light absorbing compound" refers to a chemical material that absorbs light within the visible spectrum (e.g., in the 380 to 780 nm range). A "high energy radiation absorber," "UV/HEV absorber," or "high energy light absorbing compound" is a chemical material that absorbs various wavelengths of ultraviolet light, high energy visible light, or both. A material's ability to absorb certain wavelengths of light can be determined by measuring its UV/Vis transmission or absorbance spectrum.

The terms "high energy visible light absorbing," "HEV light absorbing" or similar terms refer to contact lenses that limit transmission of one or more wavelengths of high energy visible light through the lens, for instance in the range of 400 to 450 nm.

"Ultraviolet" or "UV absorbing compounds" absorbs light within the untraviolet spectrum (e.g., in the 280 to 400 nm range). Examples of UV absorbing compounds include benzophenones, benzotriazoles and substituted acrylonitriles.

A material's ability to absorb certain wavelengths of light can be determined by measuring its UV/Vis transmission spectrum. Materials that exhibit no absorption at a particular wavelength will exhibit substantially 100 percent transmission at that wavelength. Conversely, materials that completely absorb at a particular wavelength will exhibit substantially 0% transmission at that wavelength. When included in the polymer material used to form the bowl the concentration of any light absorbing compound can be selected to provide a percent absorption sufficient to protect the lens and its components, packing solution additives or both. Percent absorption of about 20%, 30%, 50%, 70% or more of the desired wavelengths may be suitable. When included in the bowl the concentration of any light absorbing compound can be selected not to interfere with inline metrology.

Photochromic materials are those which reversibly darken upon exposure to specific intensities and wavelengths of light.

The terms "photostabilize," "photostabilized," or similar expressions mean that a contact lens containing a photosensitive light absorbing compound, as described herein, is protected against photodegradation such that it exhibits less change in average transmission over the wavelength range of 400 to 450 nm, following exposure under ICH guideline Q1B conditions as described above, than would be exhibited in the absence of the protection. The change in average transmission may be at least about 5% or about 10% less than the same lens without photostabilization. The exposure may be conducted under the ICH Photostability Guideline using an Option 2 light source with an estimated illuminance exposure of $1.5192 \times 10^6$ Lux hours (168.8 hours exposure time) and an estimated ultraviolet irradiation exposure of 259.4 Watt hours/m$^2$ (16.2 hours exposure time), preferably in a photostability chamber that is controlled at 25° C./Amb RH. After exposure, the UV/Vis spectrum of the sample is collected and compared to the spectrum of a sample that has been protected from exposure. By way of example, contact lenses which are not photostabilized and contain at least one photosensitive light absorbing compound, exhibit, after exposure to light under ICH guideline Q1B conditions (sometimes shortened herein to "ICH guideline Q1B" or "Q1B conditions") as described above, at least about 2%, at least about 5%, at least about 7%, or at least about 10%, non-reversible change in their average transmission over a wavelength range of 400 to 450 nm. Such changes may be calculated as the absolute value of the difference between the average transmission (over the indicated wavelength range) with and without the light exposure.

"Environmentally sustainable" packaging means packaging that reduces the amount of materials from the package that are landfilled and/or that increases the amount of materials that are included from recycled or sustainable sources. Packaging may be made environmentally sustainable by reducing the amount of packaging needed, increasing the amount of recycled material used in a package, incorporating biodegradable material into a package or a combination thereof.

The term "lens" refers to ophthalmic devices that reside in or on the eye. These devices can provide optical correction, cosmetic enhancement, light absorption (including UV, HEV, visible light and combinations thereof) glare reduction, therapeutic effect, including preventing the progression of myopia or presbyopia, reducing the signs or symptoms of ocular pathologies, such as dry eye, or allergic conjunctivitis, wound healing, delivery of drugs or neutraceuticals, diagnostic evaluation or monitoring, or any combination thereof. The term lens includes, but is not limited to, soft contact lenses, hard contact lenses, intraocular lenses, overlay lenses, ocular inserts, and optical inserts. Contact lenses (or "contacts") are placed directly on the surface of the eyes (e.g., placed on the film of tears that covers the surface of the eyes). Contact lenses include soft contact lens (e.g., conventional or silicone hydrogel), rigid contact lenses or hybrid contact lenses (e.g., with soft skirt or shell). Contact lenses have been considered to be Class II or Class III medical devices by the FDA since 1976.

Soft contact lenses may be formed from hydrogels. Hydrogels are crosslinked polymers that absorb water. Non-limiting examples of soft contact lenses formulations include but are not limited to the formulations of etafilcon (polyHEMA, methacrylic acid copolymer material), genfilcon, hilafilcon, lenefilcon, nelfilcon, nesofilcon, omafilcon, polymacon (polyHEMA), vifilcon, acquafilcon, olifilcon, asmofilcon, balafilcon, comfilcon, delefilcon, enfilcon, efrofilcon, fanfilcon, formofilcon, galyfilcon, kalifilcon, lotrafilcon, narafilcon, riofilcon, samfilcon, sifilcon, senofilcon, somofilcon, stenfilcon, including all of their variants and the like. Contact lens formulations may be formed from etafilcon, balafilcon, acquafilcon, lotrafilcon, comfilcon, galyfilcon, senofilcon, narafilcon, asmofilcon, delefilcon, formofilcon, kalifilcon, riofilcon, samfilcon, somofilcon, stenfilcon, sifilcon, fanfilcon, and their variants, as well as silicone hydrogels, as prepared in U.S. Pat. Nos. 4,659,782, 4,659,783, 5,244,981, 5,314,960, 5,331,067, 5,371,147, 5,998,498, 6,087,415, 5,760,100, 5,776,999, 5,789,461, 5,849,811, 5,965,631, 6,367,929, 6,822,016, 6,867,245, 6,943,203, 7,247,692, 7,249,848, 7,553,880, 7,666,921, 7,786,185, 7,956,131, 8,022,158, 8,273,802, 8,399,538, 8,470,906, 8,450,387, 8,487,058, 8,507,577, 8,637,621, 8,703,891, 8,937,110, 8,937,111, 8,940,812, 9,056,878, 9,057,821, 9,125,808, 9,140,825, 9,156,934, 9,170,349, 9,244,196, 9,244,197, 9,260,544, 9,297,928, 9,297,929 as well as WO 03/22321, WO 2008/061992, and US 2010/0048847.

"Silicone hydrogel contact lens" refers to a hydrogel contact lens that is made from at least one silicone-containing compound. Silicone hydrogel contact lenses generally have increased oxygen permeability compared to conventional hydrogels. Silicone hydrogel contact lenses use both their water and polymer material content to transmit oxygen to the eye.

"Packing Solution" means ophthalmically compatible solutions which are included in the package well with the contact lens. The packing solution is generally buffered, and has a pH and osmolality compatible with the human ocular surface. The packing solution may also comprise additional components including, but not limited to components which limit interactions between the lens and the package well and lidstock or components which provide a benefit when the lens is placed on the eye.

"Multishot molding" means processes in which parts of the package are molded in sequence or series. Multishot molding can be conducted in a single or multiple molding stations, single or multiple molding machines, which may be located in the same or a different location.

The bowl polymer material and flange polymer material are the polymer materials used to mold the bowl and flange respectively. The first and second polymer materials are the materials used for the first and second molding shots respectively. The figures show an embodiment where the first polymer material is the bowl polymer material and the second polymer material is the flange polymer material. When the flange is molded first, the flange polymer material is the first polymer material. Polymer materials describe throughout comprise at least one polymer material (which may be a homopolymer material, copolymer material or blend thereof) and may optionally comprise additives as described below.

Figure 1:
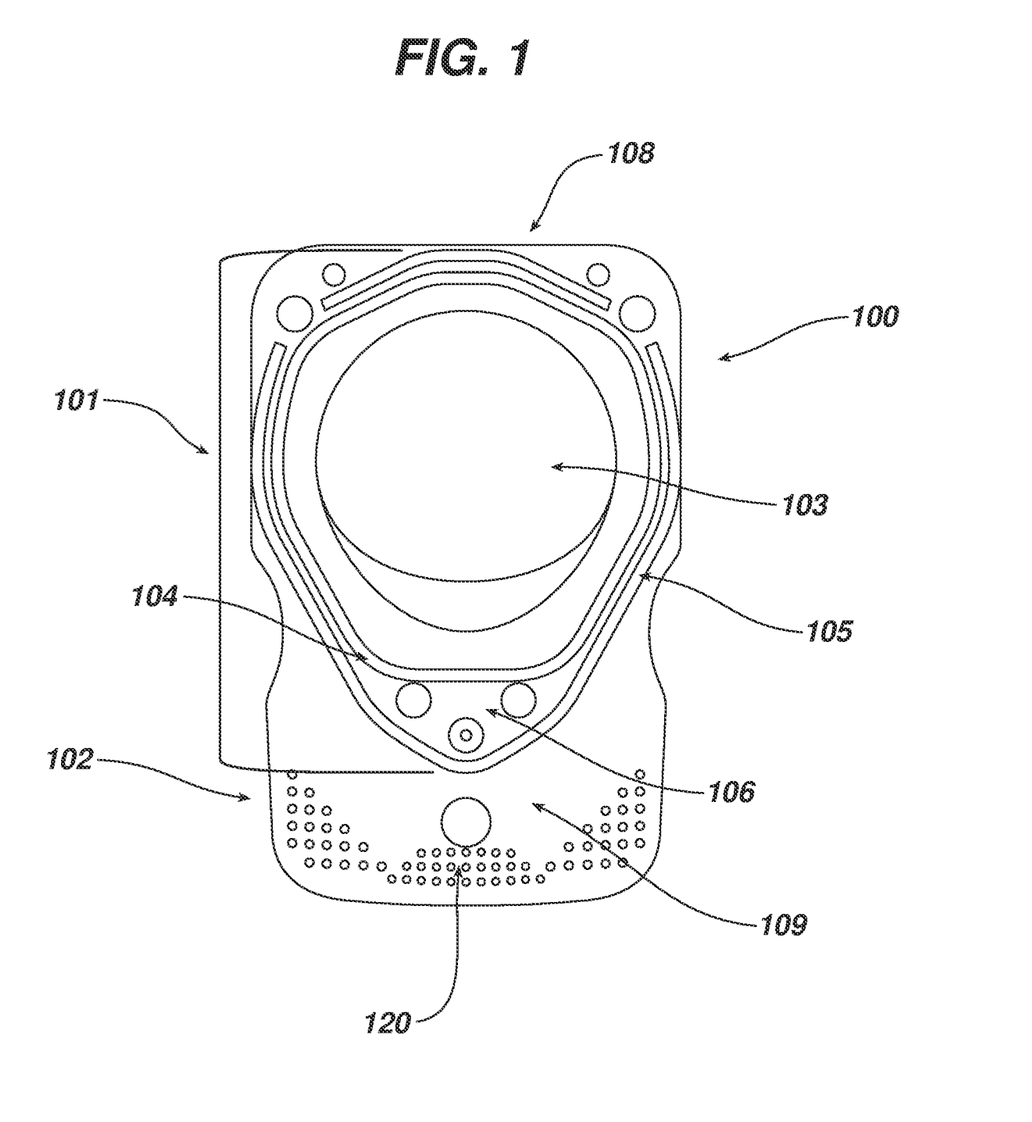
FIG. 1 is a photograph of a contact lens package.

Packages of the present invention comprise a base which is formed from at least 2 different polymer materials. Referring to FIG. 1, the bowl 101, is formed from a bowl polymer material that is suitable for packaging sterile medical devices, such as lenses, contact lenses or soft contact lenses, and is inert to the packing solution and lens. The base portion 100 comprises bowl 101 and flange 102. The flange, 102, is formed from a flange polymer material that is multishot molded.

The bowl 101 comprises a well 103 for receiving a lens and packing solution, a seal region 104 where the lidstock (not shown) is sealed to the bowl. The bowl has along its peripheral edge at least one interface tab each having one or more of slots which are encapsulated along the interface 105, by the polymer material used to mold the flange 102. It should also be appreciated that the flange region may be molded first, and if so, the flange region would include the interface tabs, interface slots and teeth described below.

To open the package, the user peels the lidstock from front 106 of the base toward the back 108 of the package. The seal between the seal region 104 of base portion 100 and the lidstock must have sufficient strength to maintain the seal which maintains sterility of the lens and solution during sterilization, shipping and storage. Peel strengths of about 0.6 to about 5.0 lbF, 1.0 to about 5.0 lbF, 1.2 to about 3.5 lbF an about 1.5 to about 3.0 lbF are common. Thus opening the package can exert substantial flexural stress on any interface between bowl 101 and flange 102. Because the user will grip the front of the flange 109 and pull the front edge of the lidstock up and toward the back of the package, the interface must be strong enough to keep the bowl from separating from the flange while the lidstock is opened.

Figure 2:
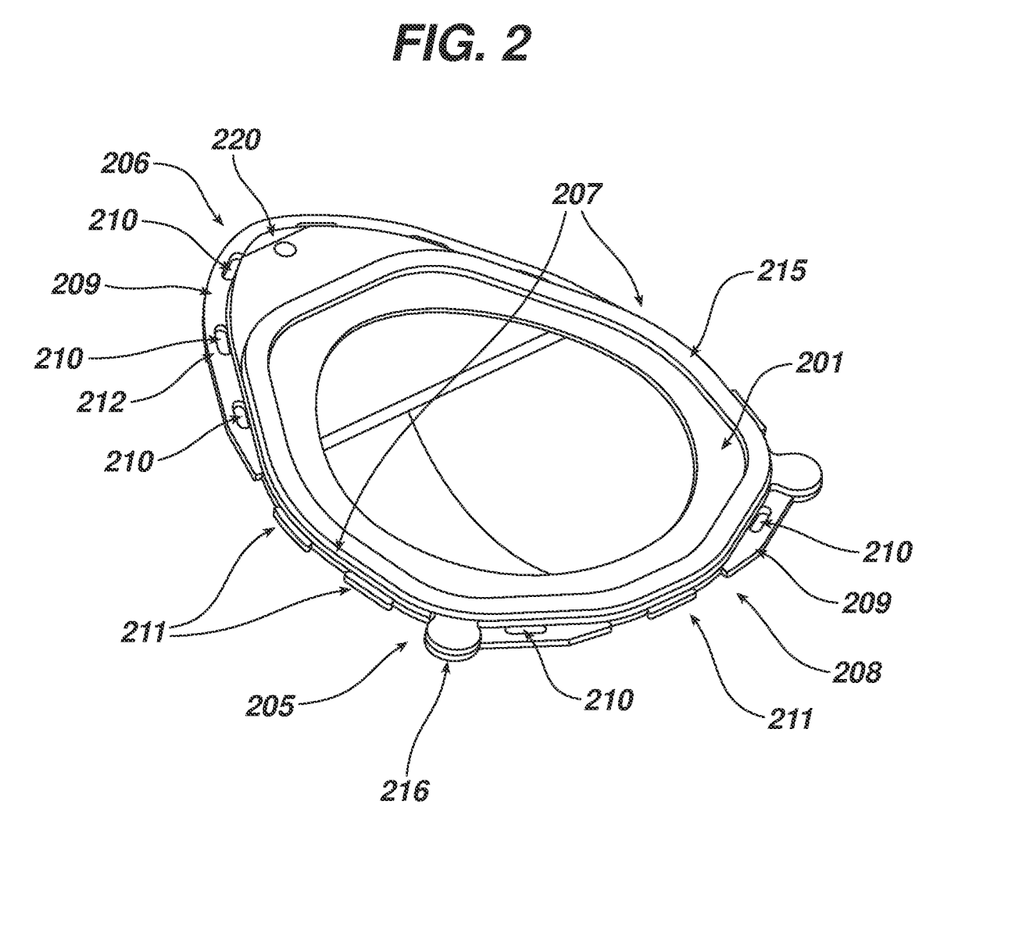
FIG. 2 is a perspective drawing of the bowl portion of a contact lens package, made according to the description of the invention contained herein.

Referring to FIG. 2, the bowl comprises at least one of interface tab 209, each interface tab comprising at least one interface slot 210.

Figure 3:
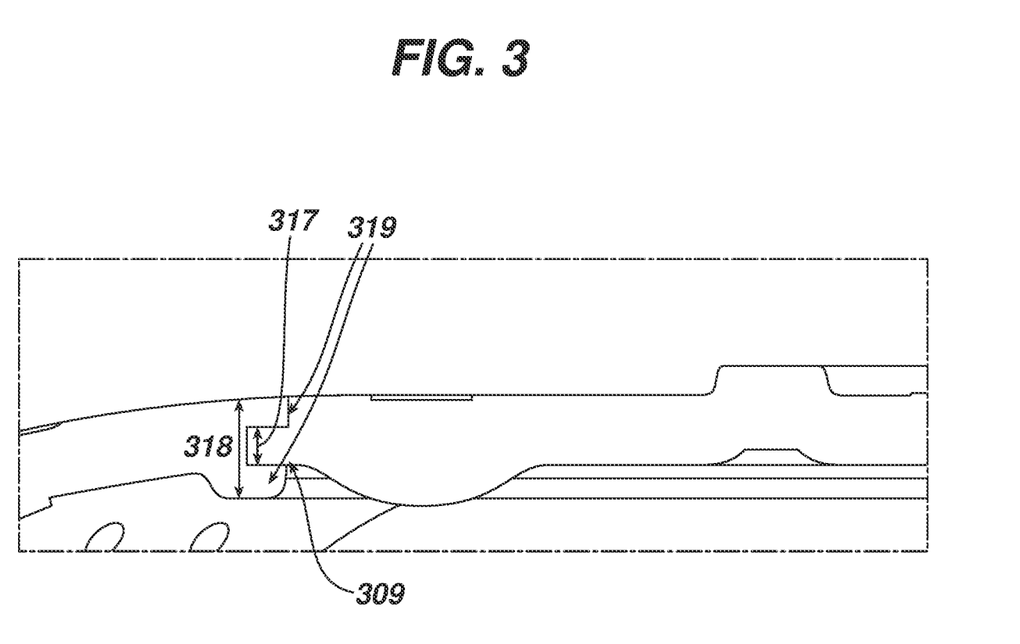
FIG. 3 is a cross-sectional view of the contact lens package at the interface at the front of the bowl and flange.
Figure 4A:
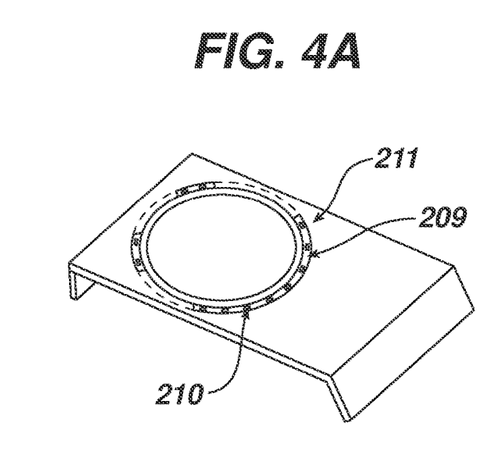
FIGS. 4a-4d are top views of the contact lens package base, showing potential placements of interface tabs, interface slots and interface teeth.
Figure 4B:
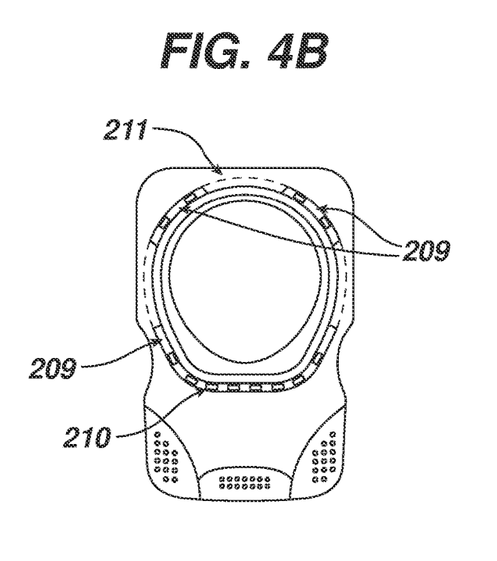
Figure 4C:
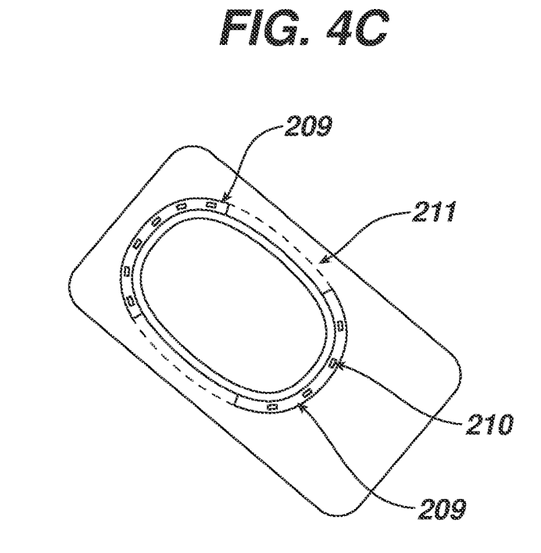
Figure 4D:
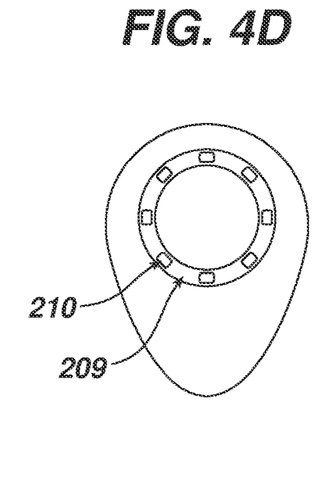

The interface tabs 209 may be coplanar with the top surface of the bowl 201 along the bowl peripheral edge 205. The interface tabs may be level with the top of the bowl, or may be offset below the top surface of the bowl, as is shown in FIG. 3. The interface tabs 209 comprise at least one interface slot 210, which is preferably closed along its outer edge 212. Closed outer edge 212 forms a "bridge" of the bowl polymer material across interface slot 210, such that when the flange polymer material is introduced into the mold to form flange 102, the flange polymer material fills in interface slot 210 and encapsulates the closed outer edge 212. The entire interface tab 209 may be partially or fully encapsulated by the flange polymer material. In cases where the bowl and flange polymer materials have compatible properties which allow bonding, partial encapsulation of interface tabs 209 may be sufficient. In cases where the bowl polymer material and flange polymer materials do not bond during molding, or where higher flexural stress is anticipated (for example where the peel strength between the lidstock and bowl is higher or as a result of stresses caused by the packages exposed to high temperatures, such as during steam sterilization) it may be preferable for the flange polymer material to encapsulate the entire interface tab, including the closed outer edges 212 of interface slots 210. Flexural stress upon package opening is generally concentrated at the front of the package, and it may be desirable to fully encapsulate the interface tabs 209 and closed outer edges 212 along the front of interface while allowing any interface tabs 209 along the back 108 to be partially encapsulated. In some embodiments all interface tabs are fully encapsulated by the flange polymer material. A cross-sectional view of a completely encapsulated interface tab 309 is shown in FIG. 3.

The lower limit for the thickness 317 of interface tab 309, and of the upper and lower encapsulating portions 319 may be determined by the ability to get a consistent amount of the respective polymer material to interface tab mold cavity during the molding process (moldabilty lower limit). The thicknesses for both the interface tab and the encapsulating regions should be strong enough to provide an interface that will not fail during package opening. When materials with different flexural moduli are used, the material with the higher flexural moduli may have a lower interface thickness and still provide the desired torsional and flexural strength to the interface. When the bowl and flange polymer materials have similar flexural moduli, maintaining the interface tab thickness and each of the encapsulating regions to within about 25% or about 10% of each other may be desirable. Examples of suitable interface tab thicknesses 317 include between about 0.3 and about 0.8 mm, or about 0.35 and about 0.6 mm. Flexural modulii may be measured by known methods, such as ASTM D790-17, "Standard Test Methods for Flexural Properties of Unreinforced and Reinforced Plastics and Electrical Insulating Materials".

The interface thickness 318 should be similar to the thickness of the adjacent areas of the flange and bowl, as sudden changes in profile thickness can lead to sink marks due to shrinkage. It will be appreciated that sink marks can be minimized by smoothing the thickness transition from the interface to the bowl and/or flange, such as by tapering or feathering. In some embodiments, the interface thickness may be up to about 60% or up to about 50% thicker than either the adjacent flange or bowl region.

It may also be desirable to minimize the total amount of polymer material used in the package to lower the cost of the package and improve sustainability.

Interface tabs 309 may have a thickness 317 that is between about 20 to about 60%, about 25 to about 55%, about 30 to about 55% of the total interface thickness 318.

The interface tabs 209 may have a width, or projection from the bowl sufficient to close the slots 210 along the outer edge 212 of the slot 210. The lower limit for the interface tab width is the moldability of the tab at the slots. The upper limit for the width of the interface tabs may be determined package design and desired plastic usage. For example, the interface tab width may be greater than the slot width by about 10% to about 100%, about 25% to about 100% or about 50% to about 100%. The interface tabs may have a constant width or may have tapered regions (such as the ends of interface tabs 209 or a narrower width between adjacent interface slots 210). Interface tabs may have widths up to about 2 mm, up to about 1.5 mm, or ranging between about 0.5 and about 2 mm or about 0.5 and about 1.5 mm.

Interface tabs 209 may be included along the periphery in any areas with at least about 1 or about 1.5 mm of width in the flange region. For example, in the package shown in FIG. 1, interface tabs may be included in the back corners and front of the bowl as shown in FIG. 2. Where space is sufficient, interface tabs with slots are preferred over teeth, as interface tabs including slots provide greater strength than teeth. The interface slots allow the second polymer material to flow through the interface tab, creating chain-like links through the interface tab. Packages with sufficient clearance around the entire bowl periphery may have a continuous interface tab. The interface tab may be included on up to 100%, about to 100%, about 40 to 100% or about 50 to 100% of the bowl periphery.

The lower limit for the length of an interface slot may be determined by the limits of the selected molding equipment and melt flow rate ("MFR") of the second polymer material. The interface tab should not break along its length when the second polymer material is introduced into the mold. For an interface tab having a single slot, such as those shown in FIG. 2 at the back 208 of the bowl, the interface tab may be at least 25% or at least 50% longer than the slot. For example, for an interface tab with a single slot having a slot length of about 2 mm, the interface tab could have a tab length of at least about 2.5 mm, or at least about 3 mm. The interface tab length may be between about 25% and about 300%, about 50% and about 300% and about 100 and about 300% longer than the interface slot. When a single interface tab contains multiple interface slots, such as at the front of the bowl in FIG. 2, it may be desirable to have no more than half of the length of the interface tab be interface slots.

The minimum size of interface slots can be determined by the number of slots in the interface tab, the properties of the first and second polymer materials, such as the melt flow rate (MFR), and the molding equipment, including molding pin strength. The slots should be large enough that the molding pins are robust and can withstand rapid molding and demolding without warpage or breakage, and so that the second polymer material can readily flow through the slot to create the desired interface link through the slot.

The longer the slot the weaker the interface link created with the second polymer material. Slot lengths of less than about 3 mm or less than about 2 mm may be desirable. Slot length ranges may include about 0.5 to about 3 mm, about 0.5 to about 2.5 mm and about 0.6 to about 2 mm.

The slots may have a width of up to about 90%, 80%, 70%, 60%, 50%, 40% or 30% of the interface tab width. The slots may have a width of between about 30 to about 80%, about 30 to about 70%, about 30 to 60%, about 30 to 50%, and about to about 40% of the interface tab width. Multiple slots with either the same or different shapes and dimensions may be incorporated into a single interface tab. The slots may be disposed in the middle of the interface tab width or adjacent to the bowl periphery.

The tab width at the side of the slot 210 distal from the bowl periphery forms a bridge 212. The bridges can melt or break during molding due to injection pressure and temperature. Intact bridges in the package provide a stronger mechanical interface. The strength of the bridge may be improved by increasing the width of the bridge. This can be done in a variety of ways, such as by maintaining the slot width, but increasing the tab width, maintaining the tab width, but decreasing the slot width. Other variations will be apparent to a package designer.

Interface slots may be evenly or irregularly distributed along the interface tabs. In one embodiment the slots are evenly distributed along the interface tabs. In another embodiment the interface slot are evenly distributed on the right and left sides of the lens periphery.

The interface slots may have any convenient shape, but generally sharp edges can be hard to mold, and sharp corners can form failure modes in injection molding. Suitable shapes for the interface slots include circles, ovals, polygons with and without rounded corners. Circles, ovals, squares, rectangles and trapezoids with rounded edges may be preferred. Rounded corners for slots are preferred. The length of the interface slot may be selected to allow the second polymer material to flow through and around the slot at molding conditions to provide the desired encapsulation and physical linkage.

The interface tabs may have one slot 210, as shown at back 208 of FIG. 2, or may have a plurality of interface slots as shown at the front 206 of FIG. 2.

The bowl may have a single interface tab with a plurality of interface slots, such as is shown at the front 206 of bowl 201, or teeth 211 may be interspersed or alternating with the interface slots 210 (as is shown at the back 208 of FIG. 2). The interface tabs 209 may have a flat profile or may be thicker at the distal side to provide addition interlocking between the first and second polymer materials.

In areas where the flexural force/stress is focused, one or more interface tab 209 each having one or more interface slots 210 are preferred. While FIG. 2 shows at the front of bowl 201 a single interface tab 209 with multiple interface slots 210, all with closed outer edges 212, interface slots with partially closed outer edges, or a combination of slots with fully and partially closed bridges can also be included.

The bowl 201 may also comprise one or more teeth 211. The teeth 211, when present, can be located along the peripheral edge 205 of bowl 201, particularly in locations where there is insufficient space for a projection necessary to form an interface slot or where adding addition material projecting out from peripheral edge 205 may be undesirable, such as on the sides 207 and back 208 of the bowl. Teeth may also be included at the front or back of the package and when included preferably alternate with interface tabs. An example of this configuration is shown in FIG. 2, at the back of the bowl periphery, with a single tooth 211 disposed along the bowl peripheral edge 205 and between two interface tabs 210. The length of the teeth may be determined by the number of teeth included and their location. Examples of suitable dimensions for the teeth include:

|  | mm | |
| --- | --- | --- |
| Length | 1-4 | 2-4 |
| Width | 0.3-2 | 0.3-1 |
| Thickness | 0.3-8 | 0.3-0.6 |

All values are preceded by about, and the ranges can be employed in any combination. The teeth may also have the same thickness as the interface tabs. The teeth may have a flat profile or may be thicker at the distal side to provide an overhang for addition interlocking between the first and second polymer materials. The teeth may have straight or rounded edges, which may be perpendicular to the bowl edge, or angled. When angled, an acute angle with respect to the bowl periphery will provide an overhang which can increase the mechanical strength of the interlock.

The circular projections or "ears" 216 at the back of bowl 205 are circular tabs where guide pins contact the bowl during molding. They can have a thickness similar to that specified for the teeth, and can optionally act as mechanical interlocks in the final package. For the flange, the gate 120 is also at the front of the package.

Feature 220 is the gate area where the bowl polymer material was introduced to the mold for the bowl region.

The package of the present invention is sterilized, usually by terminal heat sterilization (autoclaving). The well and lidstock which seals the package must be heat sterilizable and inert to the packing solution and contact lens. Thus, the seal between the lidstock and bowl can be disposed inside the bowl periphery along a seal region 215. This embodiment may be useful where the flange polymer material is either not medical grade (such as recycled polymer materials or some colored polymer materials), where the lidstock seals adequately with the bowl polymer material but not the flange polymer material, or where the flange polymer material is reactive with well contents (packing solution, packing solution additives, the lens or a combination thereof). The seal region can also be located closer to the well, as long as it is inside bowl peripheral edge 205. The seal region may have variety of shapes, such as round, ovoid, polygonal, or rounded polygonal.

The flange, bowl, well and seal region may have the same or different shapes and may be selected from circles, ovals, tear shapes, polygons, rounded polygons and combinations thereof and the like. The flange can have an elongated section at the front to provide space for the fingers to grasp the flange front region upon opening. Generally, the well has rounded sides to receive the contact lens, but the shapes for the bowl and flange may be selected from a variety of shapes to provide the desired esthetic.

The flange may have any shape, including, rectangular, oval, tear shaped, polygonal. The flange may include additional features used in contact lens packaging including textures, gripping features or voids at the front for improved grip during opening, feet or walls on the sides or back to improve stacking or stability when the package rests on a table, cut ins on the sides of the front section of the flange or a downwardly sloping section at the front of the flange. FIGS. 4a-4d show top views of different bowl/flange combinations. The placement of teeth 211 are shown by dashed lines, and the tab 209 and slot 210 placements are also shown.

The bowl and flange polymer materials may be selected from polymers, rubbers, or plastics that can molded and preferably be injection molded and are compatible with the chemical and physical properties of the lens, packing solution and any additives which may be included therein and sterilization requirements of contact lens manufacture, including, for amorphous polymers, a Tg above 120° C., or at or above about 125° C. Tg may be measured via a standard method, such as ASTM D3418-03 "Standard Test Method for Transition Temperatures of Polymer by Differential Scanning calorimetry".

Semicrystalline materials may have a melting point least 5° higher than the selected autoclaving temperature, or at least about 125° C. Semicrystalline polymer which meet the foregoing properties, including polypropylene, may be used. The bowl polymer material may also be compatible with the inspection equipment requirements of contact lens manufacture. Examples of suitable polymer materials include, without limitation, polysulfone (PSU), polyethersulfone (PESU), polycarbonate (PC), polyetherimide (PEI), polyamides, including nylons, polyolefins including polypropylene, polymethylpentene, (PMP), and olefin co-polymers, including COPs (Cyclic Olefin Polymer) and COCs, (Cyclic Olefin Co-polymers), acrylics, rubbers, urethanes, fluorocarbons, polyoxymethylene, polyvinylchloride (PVC), polyphenylsulfide (PPS), polycarbonate copolymers, polyvinylidene fluoride (PVDF), and the like and copolymers and blends of the foregoing. Blends include polybutylene terephthalate polyester blends, including PBT and PC blends, PC/polyester blends, and polypropylene blended with COPs or COCs.

The bowl polymer material may be any polymer material that can be injection molded, and provide contact lens packages have a shelf-life of at least one, two, three, four or five years and are compatible with the chemical and physical properties of the lens, packing solution and any additives which may be included therein. The bowl polymer material may be selected from any of the foregoing materials. The bowl polymer material may preferably be polypropylene having a melt temperature greater than about 145° C., COP, COCs and blends of polypropylene blended with COPs or COCs. Examples of polypropylenes include metallocene catalyzed polypropylene polymer and co-polymer, Zielgler-Natta catalyzed polypropylene polymer and co-polymer. Examples of suitable grades of polypropylene include ACHIEVE 1605 (metallocene catalyzed PP homopolymer)

and PP1264E1 (PP homopolymer, MFR=20 g/10 min) from ExxonMobil; Braskem CP360H (homopolymer), F350 HC2 (high crystallinity homopolymer, MFR=35), from Braskem; Borealis RF366MO (random copolymer with nucleating and antistatic agents), BJ380MO (heterophasic copolymer, controlled rheology with nucleating and antistatic agents) from Borealis; Moplen HE649T (homopolymer) and HP301R (homopolymer) from LyondellBasell; SABIC 512A (controlled rheology PP homopolymer); Formolene 4111T and Formelene 4142T from Formosa Plastics; FHR 11T55V, FHR P4C5N-046, FHR P4C6N-041 from Flint Hills Resources; and Total MR2001 (homopolymer material), Total M3766 (metallocene catalyzed PP homopolymer) and Total PPH10099 (controlled rheology PP homopolymer) from Total Petrochemicals. The polypropylene may have a melt flow range of about 15 g/10 minutes to about 44 g/10 minutes as determined by ASTM D-1238-10 "Standard Test Method for Melt Flow Rates of Thermoplastics by Extrusion Plastometer", or similar known methods. The polypropylene may be pristine, or may have undergone a controlled rheology process to increase its melt flow rate.

The flange polymer material may comprise any of the polymer, copolymer and polymer blends listed above. The flange polymer material may comprise virgin or recycled polymer and may comprise virgin or recycled polypropylene. An example of a recycled polypropylene which could be used in the flange is PRI-PPHO-BASE polypropylene (reground homopolymer, white or black, with an MFR between 17-22 g/10 min) from Plastic Recycling Inc.

The flange and bowl polymer materials may also comprise additives including colorants, including dyes, pigments, light absorbing compounds, including UV absorbers and HEV absorbers, nucleating agents, antioxidants, clarifiers, thermal stabilizers, tie resins, nano-clays, oxygen scavengers, plasticizers, foaming agents, flame retardants, anti-static agents, anti-fogging agents, anti-blocking agents, lubricants, slip and release agents, stearates, fibers, nanotubes, stiffening agents and combinations thereof. The polymer materials may comprise virgin polymer, recycled polymer or a combination thereof. The bowl may be formed from virgin polymer and the flange from colored polymer, recycled polymer, blends comprising the foregoing or a combination thereof. The bowl may be formed from transparent and/or colorless material and the flange from colored polymer material, recycled polymer material or a combination thereof. Any color and/or color effect may be used in the flange, including sparkles, pearlescence, marbling, swirling, combinations thereof and the like. The colored flange may be clear or opaque, and may have a consistent or gradated color.

When recycled polymer material is used in the flange it may be used in any convenient amount so long as the polymer material has the Tg or melting temperatures described above. The bowl may be formed from polymer material comprising at least one light blocking compound. The bowl and the flange may be formed from the same polymer (such as polypropylene), but may have different additive packages (such as at least one light absorbing compound in the bowl and at least one colorant in the flange). Combinations of any of the foregoing may also be used.

Suitable polymer materials for the bowl and flange polymer materials include, without limitation, including without limitation, ZEONEX™ 690R, Exxon ACHIEVE™ 1605, copolymer of polypropylene and polyethylene, blends such as blends of polypropylene with ZEONEX 690R and the like and combinations thereof.

Cyclic Olefin Polymers are produced by ring-opening metathesis polymerization of various cyclic monomers such as 8, 9, 10-trinorborn-2-ene (norbornene) or 1,2,3,4,4a,5,8, 8a-octa-hydro-1,4,5,8-dimethanonaphthalene (tetracyclododecene) followed by hydrogenation (ARTON from Japan Synthetic Rubber, Zeonex and Zeonor from Zeon Chemicals). Typical chemical structures of COP are listed below COP (ARTON®, Zeonex® and Zeonor®)

Ring opening metathesis polymerization

COP plastic resins are commercially available from Zeon Chemicals (Zeonex and Zeonor resins), Polymer and Japan Synthetic Rubber (JSR). COC plastic resins are commercially available from Topas Advanced Polymers (Topas resins) and Mitsui (APEL resins). Specific Examples include Zeonor 1420 and 1600, Zeonex 690R, E48R, 330R, Topas 6013, 6015, 6017; APEL grades APL5013VH, APL5014KL, APL5014XH and JSR ARTON, ARTON D4531, D4532, F5023.

When the first material is used to form the bowl, it can have properties suitable for forming retortable packaging capable of holding liquid for 6 months, a year, two or more years, three or more years, or 5 or more years. Suitable properties can include a water vapor transmission less than about 2.0 g-100 um/(m$^2$-day), MFR of 10 g/10 minutes to about 44 g/10 minutes, and combinations thereof. Water vapor transmission may be measured using ASTM F1249-20, "Standard Test Method for Water Vapor Transmission Rate Through Plastic Film and Sheeting Using a Modulated Infrared Sensor" or other known tests that provide similar values. It should be appreciated that some materials with higher water vapor transmission rates could be used for the bowl, by increasing the thickness of the bowl.

The second polymer material can have similar or different properties. For example, the second polymer material can be transparent, uncolored, opaque, colored, and combinations thereof and may not need to be USP/FDA Compliant as it does not need to come in contact with the packing solution or contact lens (when the heat seal is on the bowl portion of the package). This means that some polymer materials not often used in lens packaging, like polysulfone and some polycarbonates, such as Lexan, could be used as the flange polymer material.

The packages can be molded in several different ways, using a single injection molding machine with a single molding station, and for example rotating platens, a single molding machine with multiple molding stations or different machines, such as insert molding.

In some cases the outer slot wall may break when the second polymer material is introduced. Unlike prior processes which used pins to form a cavity for the second material to flow into, the present design comprises a peripheral slot which allows the second polymer material to fully encapsulate the outer slot wall, even if it breaks. The encapsulation provides improve torsional strength to the interlock.

Without the encapsulation, and particularly with first and second polymer material which do not bond to each other, interlocks such as those in U.S. Pat. No. 8,420,197 may provide strong pull force, but provide a weak interlock when subjected to flexural stress (as present upon removing the lidstock from the packages of the present invention).

The packages of the invention preferably are used to store lenses, contact lenses, or soft contact lenses, including conventional or silicone hydrogel contact lenses. The lenses may include additional functionality or components such as nutriceutical and pharmaceutical agents (OTC or prescription), wetting agents, beauty or cosmetic lenses which comprise patterns, prints, cosmetic effects and combinations thereof, light absorbing compounds including static dyes such as UV, visible or HEV absorbing compounds, and dynamic light absorbing compounds including photochromic compounds which reversibly change light and liquid crystal polymer materials. The bowl of the package may be inert to any components not bound into the contact lens polymer (by any means including, but not limited to ionic or covalent bonding, steric interactions or entrapment) such as nutriceutical and pharmaceutical agents (OTC or prescription) and wetting agents. When such components are included in the packaging solution or elute from the contact lens during storage, the polymer used for the bowl absorbs less than about 5%, about 4% about 3% or about 2% of the non-bound component.

The bowl polymer may further comprise UV or HEV absorbing compounds to to photostabilize photosensitive contact lenses contained therein, such as lenses containing photochromic or HEV absorbing compounds. The flange could be made from a virgin or recycled polymer without a UV or HEV absorbing compound.

It will be appreciated that the interface tab, teeth and slot embodiments illustrated and described herein are among myriad embodiments of bowl-flange arrangements within the scope of the invention as set forth in the appended claims.

The foregoing description, for purposes of explanation, used specific nomenclature to provide a thorough understanding of the described embodiments, such that others can, by applying knowledge within the skill of the art, readily modify and/or adapt for various applications such specific embodiments, without undue experimentation, and without departing from the general concept of the present invention. However, it will be apparent to one skilled in the art that many of the specific details may not be required to practice the described embodiments. Thus, the descriptions of the specific embodiments described herein are presented for the purposes of illustration. They are not targeted to be exhaustive or to limit the embodiments to the precise forms disclosed.

It will be apparent to one of ordinary skill in the art that many modifications and variations are possible in view of the above teachings. Such variations and modifications are intended to be within the meaning and range of equivalents of the disclosed embodiments, based on the teaching and guidance presented herein. The breadth and scope of the present invention should not be limited by any of the above-described embodiments but should be defined only in accordance with the following claims and their equivalents.

What is claimed is:

1. A package comprising:
a package base comprising a bowl comprising a well for holding a lens and having at least one interface tab on at least a portion of a peripheral edge of the bowl, the at least one interface tab comprising at least one interface slot through the at least one interface tab;
a flange at least partially surrounding the peripheral edge of the bowl, filling the at least one interface slot and at least partially encapsulating the at least one interface tab to form an interlock.

2. The package of claim 1 wherein the at least one interface tab comprises an outer edge opposite the peripheral edge of the bowl region and the interface slot has a closed edge along the outer edge of the interface tab.

3. The package of claim 1 wherein the at least one interface tab comprises a plurality of interface slots.

4. The package of claim 1 wherein the at least one interface tab comprises one to 8 interface slots.

5. The package of claim 1 wherein the at least one interface tab comprises 2 to 6 interface slots.

6. The package of claim 1 wherein the at least one interface tab has a width of up to about 2 mm.

7. The package of claim 1 wherein the at least one interface tab has a width of between about 0.5 and about 2 mm.

8. The package of claim 1 wherein the at least one interface tab is included about 30 to 100% of the bowl peripheral edge.

9. The package of claim 1 wherein the at least one interface tab comprises tapered regions.

10. The package of claim 1 wherein at least one of the at least one interface tabs is located at a front section of the bowl region and the at least one interface slot comprises a plurality of interface slots.

11. The package of claim 10 wherein the at least one interface tab has a length between about 30% and 50% of the bowl peripheral edge.

12. The package of claim 1 wherein the at least one interface tab comprises at least two interface tabs, with one of the at least two interface tabs located at a front section of the bowl region peripheral edge and at least one of the at least two interface tabs located at a back section of the bowl region peripheral edge.

13. The package of claim 12 wherein the at least one interface tab at the front section comprises multiple interface slots.

14. The package of any of the foregoing claims wherein the at least one interface slots have rounded corners.

15. The package of claim 14 wherein the at least one interface slots are oval or rounded rectangle in shape.

16. The package of claim 1 or 14 wherein each of the at least one interface tabs have a thickness that is thinner than the flange thickness.

17. The package of claim 16 wherein each of the at least one interface tabs independently has a thickness that is between about 20 to about 60%, about 25 to about 55%, or about 30 to about 55% of the total thickness of the interlock.

18. The package of claim 1 wherein each of the at least one interface tabs independently has a thickness between about 0.3 and about 0.8 mm.

19. The package of claim 1 where each of the at least one interface slots has a width of up to about 90% of the at least one interface tab width.

20. The package of claim 1 where one or more of the at least one interface slots have a length less than about 3 mm.

21. The package of claim 20 wherein the at least one interface slot is a single interference slot and the at least one interface tab is at least about 25% or at least 50% longer than the length of the slot.

22. The package of claim 1 wherein each of the at least one interface tabs has one or more interface slots each having a slot width, and each of the at least one interface tabs independently has a width that is about 10% to about 100% greater than an aggregate of the slot widths of the interface slots within the at least one interface tab.

23. The package of claim 1 wherein the bowl region and the flange region are formed from a bowl polymer material and a second polymer material, respectively.

24. The package of claim 1 wherein at least one of the at least one interface tabs has a length and comprises a plurality of interface slots, wherein the plurality of interface slots have an aggregate length no more than half the at least one interface tab length.

25. The package of claim 24 wherein the at least one interface slots are evenly distributed along the interface tabs.

26. The package of as in any claim 1-13 or 15-25, in which interface slots have a shape selected from circles, ovals, polygons with and without rounded corners or combinations thereof.

27. The package of claim 1 or 23 where the at least one interface slots have a shape selected from circles, ovals, squares, rectangles, trapezoids with rounded edges and combinations thereof.

28. The package of claim 1 or 23 where the at least one slots are closed at an edge distal from the bowl peripheral edge.

29. The package of claim 23 wherein, during molding, the second polymer material flows through and around the interface slot.

30. The package of claim 29 wherein the second polymer material at least partially encapsulates the at least one interface tabs.

31. The package of claim 29 wherein the second polymer material encapsulates the at least one interface tabs.

32. The package of claim 1 further comprising one or more teeth disposed on the bowl periphery.

33. The package of claim 32 wherein the at least one interface tabs and teeth alternate around the bowl periphery.

34. The package of claim 32 wherein the teeth at the back or sides of the bowl periphery.

35. The package of claim 32 where the teeth are disposed between interface tabs.

36. The package as in one of claims 32-34 wherein the teeth have a flat profile.

37. The package as in one of claims 32-34 wherein the teeth are thicker at a distal end.

38. The package as in one of claims 32-35 wherein the teeth have a length between about 1 to about 4 mm or about 2 to about 4 mm.

39. The package as in one of claims 32-35 wherein the teeth have a width between about 0.3 and about 2 mm or about 0.3 and about 1 mm.

40. The package as in one of claims 32-35 wherein the teeth have a thickness between about 0.3 and about 0.8 mm and about 0.3 and about 0.6 mm.

41. The package of claim 1 further comprising a seal region disposed between the bowl and the peripheral edge of the bowl.

42. The package of claim 23 wherein the bowl polymer material is transparent and the second polymer material is selected from colored polymer material, opaque polymer material, recycled polymer material, and combinations thereof.

43. The package of claim 23 wherein the bowl polymer material is selected from transparent polymer material, virgin polymer material, colored polymer material, polymer material comprising at least one light absorbing compound, and combinations thereof.

44. The package of claim 23 wherein the bowl polymer material is transparent and the second polymer material is colored.

45. The package of claim 23 wherein the bowl polymer material is virgin polymer material and the second polymer material comprises recycled polymer material.

46. The package of claim 23 wherein the bowl polymer material, the flange polymer material or both may comprise at least one additive independently selected from the group consisting of colorants, including dyes, pigments, light absorbing compounds, including UV absorbers and HEV absorbers, nucleating agents, antioxidants, clarifiers, thermal stabilizers, tie resins, nano-clays, oxygen scavengers, plasticizers, foaming agents, flame retardants, anti-static agents, anti-fogging agents, anti-blocking agents, lubricants, slip and release agents, stearates, fibers, nanotubes, stiffening agents and combinations thereof.

47. The package of claim 23 wherein the bowl polymer material comprises at least one polymer selected from the group consisting of polypropylene having a melt temperature greater than about 145° C., cycloolefin polymers, cycloolefin copolymers and blends thereof.

48. The package of any of claim 23 or 42-47 wherein the bowl polymer has a water vapor transmission less than about 2.0 g-100 um/(m²-day), MFR of 10 g/10 minutes to about 44 g/10 minutes, and combinations thereof.

49. The package claim 1 further comprising a lidstock sealed to the package base to enclose the well and hold the lens between said bowl and the lidstock.

50. The package claim 49 wherein the lidstock is sealed to the bowl.

51. The package of claim 1 wherein the flange extends laterally from the bowl peripheral edge.

52. The package claim 49 wherein the package is autoclavable.

53. The package of claim 23 wherein the a polymer material comprises at least one polymer selected from the group consisting cycloolefin polymers, cycloolefin copolymers and blends thereof, and the flange polymer material is selected from virgin or recycled polypropylene having a melt temperature greater than about 145° C.

* * * * *

UNITED STATES PATENT AND TRADEMARK OFFICE
CERTIFICATE OF CORRECTION

PATENT NO. : 12,310,474 B2
APPLICATION NO. : 17/934280
DATED : May 27, 2025
INVENTOR(S) : Gooch et al.

Page 1 of 1

It is certified that error appears in the above-identified patent and that said Letters Patent is hereby corrected as shown below:

In the Claims

Claim 16, Column 14, Line 47:
Please correct: "The package of claim 1 or 14 . . ."
To read: -- The package of claim 1 . . . --

Signed and Sealed this
Eighth Day of July, 2025

Coke Morgan Stewart
*Acting Director of the United States Patent and Trademark Office*